(12) United States Patent
Lee et al.

(10) Patent No.: US 8,855,309 B2
(45) Date of Patent: Oct. 7, 2014

(54) APPARATUS AND METHOD FOR PROVIDING SECURITY SERVICE

(71) Applicant: Electronics and Telecommunications Research Institute, Daejeon (KR)

(72) Inventors: Yun-Koo Lee, Daejeon (KR); Jae-Heon Kim, Daejeon (KR); Sang-Woon Yang, Daejeon (KR); Jun-Young Son, Daegu (KR); Bong-Soo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/681,202

(22) Filed: Nov. 19, 2012

(65) Prior Publication Data

US 2013/0329887 A1 Dec. 12, 2013

(30) Foreign Application Priority Data

Jun. 12, 2012 (KR) .................... 10-2012-0062461

(51) Int. Cl.
| | |
|---|---|
| *H04L 9/00* | (2006.01) |
| *H04L 9/08* | (2006.01) |
| *G06F 21/75* | (2013.01) |
| *G06F 21/72* | (2013.01) |
| *H04L 9/06* | (2006.01) |

(52) U.S. Cl.
CPC ......... *H04L 9/0869* (2013.01); *H04L 2209/046* (2013.01); *G06F 21/75* (2013.01); *G06F 21/72* (2013.01); *H04L 9/0662* (2013.01)
USPC .......................................... 380/268; 380/255

(58) Field of Classification Search
CPC ........................... H04L 63/0428; G06F 21/602

USPC .......................................................... 380/255
See application file for complete search history.

(56) References Cited

U.S. PATENT DOCUMENTS

| | | | |
|---|---|---|---|
| 2010/0275028 A1* | 10/2010 | Takashima | ..................... 713/176 |
| 2011/0252244 A1 | 10/2011 | Lesea et al. | |
| 2012/0072723 A1* | 3/2012 | Orsini et al. | .................. 713/165 |

FOREIGN PATENT DOCUMENTS

| | | |
|---|---|---|
| EP | 1293856 A1 | 3/2003 |
| EP | 1308885 A1 | 5/2003 |
| EP | 1693817 A1 | 8/2006 |
| EP | 1701469 A1 | 9/2006 |
| EP | 1785906 A2 | 5/2007 |
| KR | 10-0571695 B1 | 4/2006 |
| KR | 10-2006-0108699 A | 10/2006 |
| KR | 10-2008-0054792 A | 6/2008 |
| KR | 10-2011-0106849 A | 9/2011 |
| WO | 2005/124506 A2 | 12/2005 |
| WO | 2010/054369 A1 | 5/2010 |

OTHER PUBLICATIONS

Andres Torrubia et al., "Information Security in Multiprocessor Systems Based on the X86 Architecture," Computers & Security vol. 19, No. 6, pp. 559-563, 2000.

* cited by examiner

*Primary Examiner* — Ghazal Shehni

(74) *Attorney, Agent, or Firm* — L R K Patent Law Firm

(57) ABSTRACT

An apparatus and method for providing a security service are provided. The apparatus for providing a security service includes a first block cipher and a second block cipher. The second block cipher is independent of the first block cipher, and is configured to be used as a random number generator when the first block cipher is used to perform encryption/decryption, and to be used to perform encryption/decryption when the first block cipher is used as a random number generator.

7 Claims, 4 Drawing Sheets

APPARATUS AND METHOD FOR PROVIDING SECURITY SERVICE

CROSS REFERENCE TO RELATED APPLICATION

This application claims the benefit of Korean Patent Application No. 10-2012-0062461, filed on Jun. 12, 2012, which is hereby incorporated by reference in its entirety into this application.

BACKGROUND OF THE INVENTION

1. Technical Field

The present invention relates generally to system security technology and, more particularly, to an apparatus and method for providing a security service, which can mask the intermediate results of an operation using an internally generated random number, thereby effectively providing the security that can prevent the illegitimate transfer of information to the outside.

2. Description of the Related Art

In systems using a microprocessor, a security service is recognized not as a choice but as a necessity. However, security services themselves have become the targets of logical and physical attacks. The results of recent research report that many technologies used to support security service have vulnerabilities and it is therefore difficult to guarantee sufficient reliability.

Security services are being provided in the many systems that use a microprocessor in a variety of ways. Security services are being applied in the form of a variety of applications such a vaccination program, an e-commerce application and an application that encrypts confidential information. Security services are being applied to a variety of platforms such as a computer, a mobile phone, and a variety of types of mobile terminals. There is a need for reliable, high-speed security service that can reduce the load to be imposed on systems in a variety of the above-described environments.

Korean Unexamined Patent Application Publication No. 2008-0054792 discloses an apparatus for multiplexing a hardware security module that is used in e-commerce or customer authentication, but the applications that this technology can be applied to are limited.

Accordingly, there is an urgent need for new technology that is capable of providing a variety of applications with a reliable high-performance security service.

SUMMARY OF THE INVENTION

Accordingly, the present invention has been made keeping in mind the above problems occurring in the prior art, and an object of the present invention is to provide a hardware structure that is capable of when providing a system with a security service, providing high-performance security service while being robust to physical attack.

Another object of the present invention is to provide a security service technology that is capable of being effectively applied to a variety of types of embedded systems, System On Chip (SoC) designs and computing environments.

In order to accomplish the above objects, the present invention provides an apparatus for providing a security service, including a first block cipher; and a second block cipher configured to be independent of the first block cipher, and configured to be used as a random number generator when the first block cipher is used to perform encryption/decryption, and to be used to perform encryption/decryption when the first block cipher is used as a random number generator.

The random number generator may provide a generated random number to any one of the first and second block ciphers, which is used to perform encryption/decryption, and the generated random number may be used to mask the intermediate results of the encryption/decryption.

The apparatus for providing a security service may operate as a slave for the security service, and reserve the right of possession of a bus via a wait state if data is not ready when a master requests the data in order to provide the security service.

The apparatus for providing a security service may immediately send the minimum amount of data required for transmission as soon as the minimum amount of data has been collected while reserving the right of possession of the bus.

The apparatus for providing a security service may reserve the right of possession of the bus via the wait state if reception of data is not ready when the master sends the data to provide the security service.

The apparatus for providing a security service may receive the data as soon as a space of a minimum size required to receive the data becomes present in a buffer while reserving the right of possession of the bus.

The master may be a USB interface controller including Double USB buffers; and the apparatus for providing a security service may reserve the right of possession of the bus via the wait state when receiving data from the Double USB buffers or sending data to the Double USB buffers.

In order to accomplish the above objects, the present invention provides a method of providing a security service, including generating, by a slave that provides the security service, a random number using any one of two different types of block ciphers; and performing encryption/decryption using a remaining one of the block ciphers.

The method may further include reserving, by the slave, a right of possession of a bus via a wait state until the minimum amount of data required for transmission has been collected; and sending, by the slave, the minimum amount of data via the bus to provide the security service.

The sending the minimum amount of data may include sending the minimum amount of data as soon as the minimum amount of data has been collected while reserving the right of possession of the bus.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
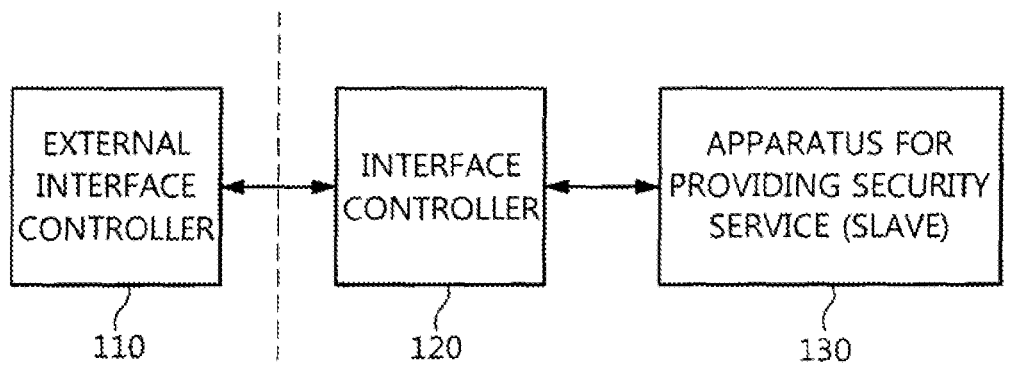
FIG. 1 is a block diagram showing a security service provision system including an apparatus for providing a security service according to an embodiment of the present invention.

The present invention will be described in detail below with reference to the accompanying drawings. Repeated descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

Preferred embodiments of the present invention will be described in detail below with reference to the accompanying drawings.

FIG. 1 is a block diagram showing a security service provision system including an apparatus for providing a security service according to an embodiment of the present invention.

Referring to FIG. 1, in the security service provision system according to the embodiment of the present invention, the interface controller 120 of the target system communicates with an external interface controller 110, and also communicates with an apparatus 130 for providing a security service inside the target system.

For example, the interface controller 120 and the external interface controller 110 may be USB interface controllers.

The apparatus 130 for providing a security service corresponds to an engine inside the target system that provides a security service. Here, the interface controller 120 may correspond to a master, and the apparatus 130 for providing the security service may correspond to a slave.

Encryption services for the security service include encryption/decryption signature/verification, and Hash/message authentication code (MAC). The encryption/decryption operation has in particular been vulnerable to external attack. It is well known that important key information can be obtained from an encryption/decryption operation via a side channel attack such as Simple Power Analysis (SPA) or Differential Power Analysis (DPA). In order to cope with such external attacks, the transfer of information that is generated by an internal operation must be blocked using a masking technique. However, the application of a masking technique engenders the problems of requiring a large number of random numbers and lengthening a critical delay path inside an operator.

The present invention provides a technique that is capable of efficiently providing an encryption service while effectively defending against external attack and also achieving optimum performance between a slave providing the encryption service and a master receiving the encryption service.

When the slave that provides the encryption service like the apparatus 130 for providing a security service shown in FIG. 1 performs an encryption/decryption operation, it may unintentionally transfer key information to the outside via power or the electromagnetic (EM) field. In order to prevent such unintentional transfer, intermediate operation results must be masked using internally generated random numbers. Here, the generation of a large number of random numbers requires a large computational load like encryption/decryption operations. Accordingly, a random number generator itself occupies a lot of resources in terms of hardware design.

The present invention provides a design technique, in which the apparatus 130 for providing a security service that corresponds to a slave that provides an encryption service implements two types of block encryption apparatuses, and one type of block encryption apparatus is used as a random number generator and the other type of block encryption apparatus is used to execute an encryption/decryption operation.

The block encryption apparatuses may compete with each other in order to be selected as a standard or in order to satisfy user requirements. Accordingly, the difference in performance between the block encryption apparatuses is not large, and sufficient performance can be achieved even when they are implemented using random number generators.

Consequently, the random number generator and the encryption/decryption operator come to have similar throughput, and a situation in which the encryption/decryption operator goes into suspension because the random numbers used to apply an attack prevention technique have been reduced or eliminated. Furthermore, two types block encryption can be utilized, and thus a wide scope of application can be ensured.

Figure 2:
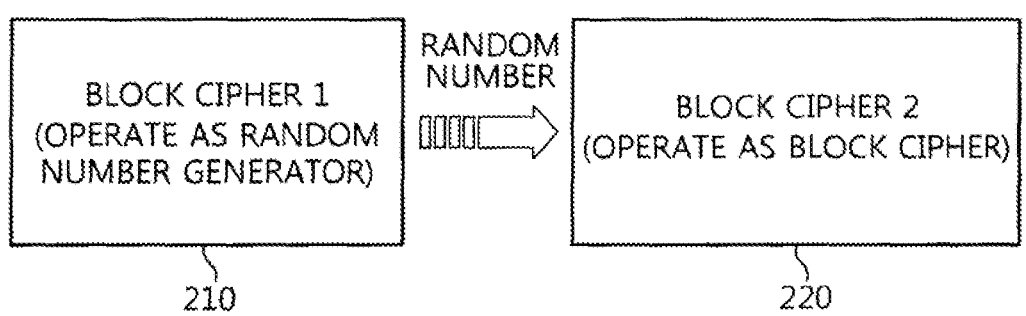
FIGS. 2 and 3 are drawings showing a technique for operating the apparatus for providing a security service according to an embodiment of the present invention.
Figure 3:
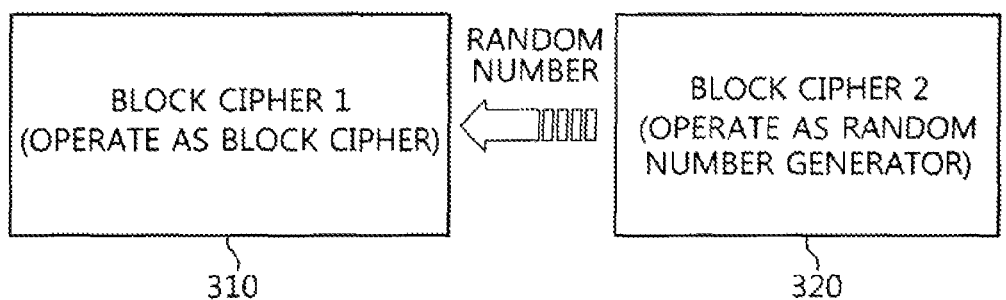

FIGS. 2 and 3 are drawings showing a technique for operating the apparatus for providing a security service according to an embodiment of the present invention.

Each of the apparatuses for providing a security service as shown in FIGS. 2 and 3 includes two types of block ciphers.

Referring to FIG. 2, when a block cipher 210 is used as a random number generator, a block cipher 220 is used as an encryption/decryption operator. Here, the block cipher 210 provides the generated random number to the block cipher 220 used as the encryption/decryption operator, so that the generated random number is used to mask the intermediate results of the encryption/decryption operation.

Referring to FIG. 3, when the block cipher 310 is used as an encryption/decryption operator, the block cipher 320 is used as a random number generator. Here, the block cipher 320 provides the generated random number to the block cipher 310 used as an encryption/decryption operator, so that the generated random number is used to mask the intermediate results of the encryption/decryption operation.

Although not shown in FIGS. 2 and 3, the apparatus for providing a security service may further include a masking unit that mask the intermediate results of the encryption/decryption operation using the generated random number. In an embodiment, the masking unit may include block ciphers 210, 220, 310 and 320 therein.

The apparatus 130 for providing a security service that is a slave that provides a security service processes and returns data or the data desired by a master in response to a request from the master. Since the operation of the slave takes some time because of the nature of the encryption operations that are used to provide a security service, the master waits for a sufficiently long time, or checks how much data has been processed by the current slave and then reads the results of the processing.

When the master frequently issues requests, the above process causes additional overhead. Furthermore, when the resulting data produced by the slave is immediately used in another process, this results in considerable deterioration of the performance of the system.

In order to solve the problem, in the present invention, when the master requests data from the slave that is providing the encryption service, the slave reserves the right of possession of a bus via a wait state when a response is not ready, and immediately loads a response onto the bus when the response is ready. Response data may be intermittently ready. The slave immediately sends response data to the master as soon as the response data is ready, and utilizes a wait state when it cannot immediately send the data.

If the slave cannot immediately receive data when the master sends the data to the slave that provides the encryption service, the slave reserves the right of possession of the bus via a wait state. When a free space becomes present in an input buffer because the slave processes the requested data, the slave receives data from the master. This process is repeated until the slave receives all of the data sent by the master.

That is, if the slave does not make the data available when the security service master requests the data to provide security service, the slave reserves the right of possession of the bus via a wait state. In this case, the slave may immediately send the minimum amount of data required to be sent when the minimum amount of data has been collected while the right of possession of the bus is being reserved.

Meanwhile, if the slave is not ready to receive data when the security service master desires that the data be sent in order for the security service to be provided, the slave reserves the right of possession of the bus via a wait state. In this case, the slave may immediately receive the corresponding data when a space of a minimum size becomes present in a buffer while the right of possession of the bus is being reserved.

Consequently, the master communicates with the slave that provides the encryption service via a wait state without requiring software handshaking that checks on the preparation, and thus the performance of the entire system is improved.

In particular, in the case of a USB controller, two buffers (a Double USB buffers) are frequently used to process a host request. While one buffer is sending and receiving communication data to and from the host, the other buffer receives and sends data from and to another location (memory or register) inside the target system while communicating with the other location. Normally communication into the target system is performed at high speed. When the communication with the host is terminated, the buffer that was used to perform communication into the target system may be immediately used to perform subsequent communication with the host. Since the buffer that was used to communicate with the host enters the state of being available for communication into the target system, it may be immediately used to perform subsequent communication into the target system. This procedure is performed along with the frequent intervention of an interrupt handler that is called when the buffer used to communicate with the host becomes full or empty. As a result, the slave that provides the encryption service optimizes communication with the master via a wait state, and thus may perform a series of the above-described processes without interruption.

Since the USB interface is configured such that USB devices share a bus, a transaction should be completed as quickly as possible once communication using the USB interface has started. Accordingly, if the period of communication between the USB interface controller and the engine for information security is minimized and also the intervention of software is eliminated, the interruption of data transmission/reception can be minimized upon USB communication with the outside, so that the performance of the entire system can be considerably improved.

Figure 4:
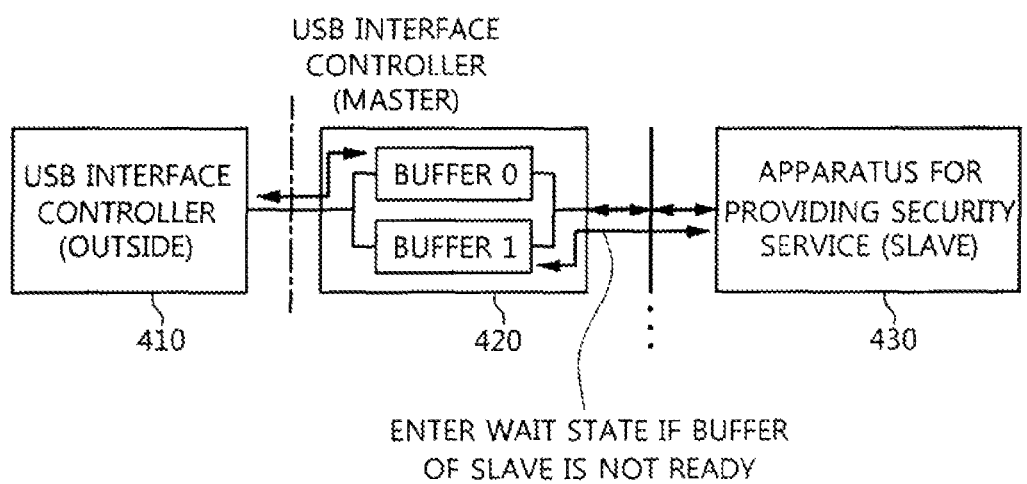
FIGS. 4 and 5 are diagrams showing the transmission of data between a USB controller having double USB buffers and a slave.
Figure 5:
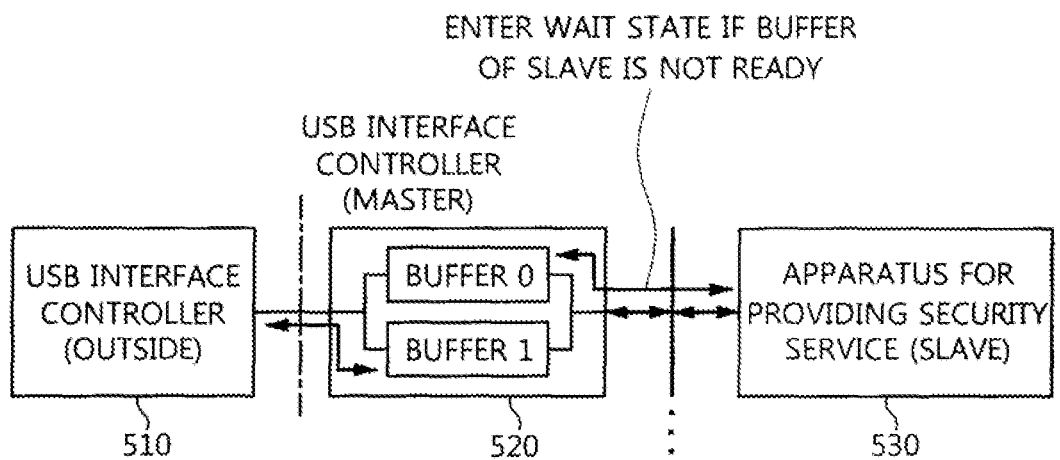

FIGS. 4 and 5 are diagrams showing the transmission of data between a USB controller having double USB buffers and a slave.

Referring to FIG. 4, the USB interface controller 420 of the target system communicates with the external USB interface controller 410, and also communicates with the apparatus 430 for providing a security service inside the target system. In this case, the apparatus 430 for providing a security service corresponds to an engine used to provide information security.

In this case, the USB interface controller 420 corresponds to the master of a security service, and the apparatus 430 for providing a security service corresponds to the slave of a security service.

The USB interface controller 420 includes Double USB buffers BUFFER 0 and BUFFER 1.

As shown in FIG. 4, when BUFFER 1 is ready for internal use, BUFFER 0 is used to communicate with the external USB interface controller 410, and BUFFER 1 communicates with the apparatus 430 for providing a security service that corresponds to the slave. In this case, the apparatus 430 for providing a security service possesses a bus via a wait state when BUFFER 1 or its own buffer is not ready.

Referring to FIG. 5, the USB interface controller 520 of the target system communicates with the external USB interface controller 510, and also communicates with the apparatus 530 for providing a security service inside the target system. In this case, the apparatus 530 for providing a security service corresponds to an engine used to provide information security.

In this case, the USB interface controller 520 may correspond to a security service master, and the apparatus 530 for providing a security service may correspond to a security service slave.

The USB interface controller 520 includes double USB buffers BUFFER 0 and BUFFER 1.

As shown in FIG. 5, when BUFFER 0 is ready for internal use, BUFFER 1 is used to communicate with the external USB interface controller 510, and BUFFER 0 communicates with the apparatus 530 for providing a security service that corresponds to the slave. In this case, the apparatus 530 for providing a security service possesses a bus via a wait state When BUFFER 0 or its own buffer is not ready.

Figure 6:
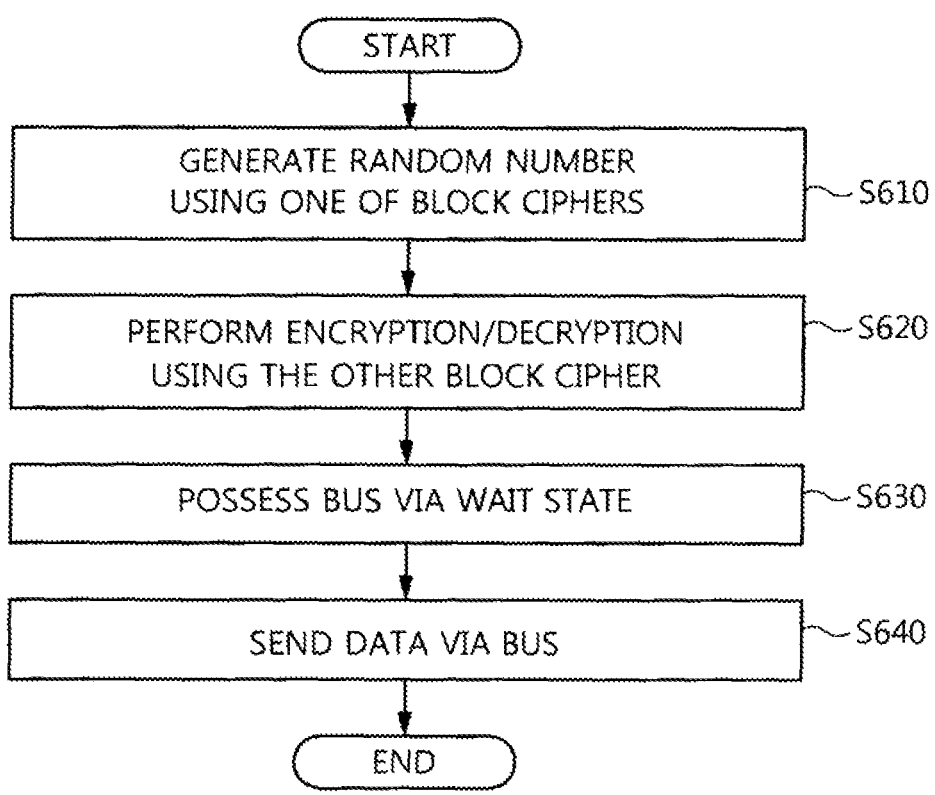
FIG. 6 is a flowchart showing a security service method according to an embodiment of the present invention.

FIG. 6 is a flowchart showing a security service method according to an embodiment of the present invention.

Referring to FIG. 6, in the security service method according to the embodiment of the present invention, a slave that provides security service generates a random number using any one of two different types of block ciphers at step S610.

Thereafter, encryption/decryption is performed using the other one of the block ciphers at step S620.

Furthermore, the slave reserves the right of possession of the bus via a wait state until the minimum amount of data required to be sent has been collected at step S630.

Furthermore, the slave sends the minimum amount of data via the bus to provide the security service at step S640.

At step S640, the minimum amount of data may be sent to a main processor set on which an operating system is running and to the security service master, that is, independent hardware on which an application is operating.

At step S640, when the minimum amount of data has been collected while the right of possession of the bus is being reserved, the collected data may be immediately sent.

The above-described apparatus and method for providing a security service according to the present invention is not limited only to the configurations of the above-described embodiments, but parts and the entireties of the embodiments may be configured to be selectively combined with one another so that a variety of modifications can be made to the embodiments.

The present invention has the advantage of being structurally robust to logical and physical attacks when providing a security service in a system using microprocessor.

Furthermore, the present invention has the advantage of enabling a system using microprocessor to achieve maximum performance while providing effective and robust security service against external attacks.

Furthermore, the present invention has the advantage of being effectively applied not only to a variety of types of embedded systems, SoC designs and computing environments but also to vaccination programs and e-commerce, thereby contributing to guaranteeing the convenience and safety of a system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for providing a security service, the apparatus executed by at least one processor and comprising:
   at least one hardware processor;
   a first block cipher loaded on the at least one processor; and
   a second block cipher loaded on the at least one processor and configured to be independent of the first block cipher,
   wherein the second block cipher is configured to be used as a random number generator while the first block cipher is used to perform encryption/decryption, or the second block cipher is configured to perform encryption/decryption while the first block cipher is used as the random number generator,
   wherein one of the first and second block ciphers operating as the random number generator provides a generated random number to another one of the first and second block ciphers performing encryption/decryption, and
   wherein the generated random number is used to mask intermediate results of the encryption/decryption.

2. The apparatus of claim 1, wherein the apparatus for providing the security service operates as a slave for the security service, reserves a right of possession of a bus via a wait state if data a master requests the data from the slave for the security service and the data is not ready to be sent, and immediately sends a minimum amount of data required for transmission as soon as the minimum amount of data has been collected while reserving the right of possession of the bus.

3. The apparatus of claim 1, wherein the apparatus for providing the security service operates as a slave for the security service, reserves a right of possession of a bus via a wait state if reception of data is not ready when a master sends the data to provide the security service, and receives the data as soon as a space of a minimum size required to receive the data becomes present in a buffer while reserving the right of possession of the bus.

4. The apparatus of claim 3, wherein:
   the master is a USB interface controller including Double USB buffers; and
   the apparatus for providing the security service reserves the right of possession of the bus via the wait state when receiving data from the Double USB buffers or sending data to the Double USB buffers.

5. A method of providing a security service, comprising:
   generating, by a slave that is executed by at least one hardware processor and provides the security service, a random number using any one of two different types of block ciphers executed by the at least one processor; and
   performing encryption/decryption using another one of the two different types of block ciphers,
   wherein one of the two different types of block ciphers operating as a random number generator provides the generated random number to another one of the two different types of block ciphers performing the encryption/decryption, and
   wherein the generated random number is used to mask intermediate results of the encryption/decryption.

6. The method of claim 5, further comprising:
   reserving, by the slave, a right of possession of a bus via a wait state until a requested data is transmitted; and
   sending, by the slave, the minimum amount of data via the bus to provide the security service.

7. The method of claim 6, wherein the sending of the minimum amount of data comprises sending the minimum amount of data as soon as the minimum amount of data has been collected while reserving the right of possession of the bus.

* * * * *